United States Patent [19]

Chu et al.

[11] Patent Number: 5,049,615

[45] Date of Patent: Sep. 17, 1991

[54] POLYINDANES AS PROCESSING AID FOR ENGINEERING THERMOPLASTICS

[75] Inventors: Sung G. Chu, Hockessin, Del.; Birendra K. Patnaik, West Chester, Pa.; Keith S. Shih, Newark, Del.

[73] Assignee: Hercules Incorporated, Wilmington, Del.

[21] Appl. No.: 448,394

[22] Filed: Dec. 11, 1989

[51] Int. Cl.$^5$ .............. C08L 53/02; C08L 71/12; C08L 69/00; C08L 2502

[52] U.S. Cl. .............................. 525/92; 525/64; 525/66; 525/67; 525/68; 525/99; 525/133; 525/146; 525/150; 525/152; 525/153; 525/177; 525/179; 525/184; 525/189

[58] Field of Search ............ 525/68, 92, 152, 64, 525/66, 67, 99, 133, 146, 150, 153, 177, 179, 184, 189

[56] References Cited

U.S. PATENT DOCUMENTS

| | | | |
|---|---|---|---|
| 4,090,996 | 5/1978 | Gergen | 525/92 |
| 4,098,845 | 7/1978 | Keck | 525/177 |
| 4,162,277 | 7/1979 | Li | 525/146 |
| 4,537,930 | 8/1985 | Bussink | 525/92 |
| 4,797,447 | 1/1989 | Gergen | 525/153 |

*Primary Examiner*—John C. Bleutge
*Assistant Examiner*—David Buttner
*Attorney, Agent, or Firm*—Mark Goldberg

[57] ABSTRACT

Novel thermoplastic compositions are provided comprising a blend of a polyindane resin and an engineering thermoplastic such as polyphenylene ethers, polysulfones, polycarbonates, polyether ether ketones, polyarylates, polyamides, polyimides and polyphenylene sulfides. Blends of thermoplastic block copolymers with polyindane resins are also provided. These blends provide improved processability with good physical properties including high impact strength and high heat distortion temperature.

18 Claims, No Drawings

POLYINDANES AS PROCESSING AID FOR ENGINEERING THERMOPLASTICS

BACKGROUND OF THE INVENTION

This invention relates to a thermoplastic engineering resin composition comprising a blend of a polyindane resin and an engineering thermoplastic such as polyphenylene ethers, polysulfones, and polycarbonates. These blends provide improved processability with good physical properties including impact strength and high heat distortion temperature. The polyindanes of this invention also provide similar benefits to the processing of thermoplastic block copolymers.

Engineering thermoplastics, such as polyphenylene ethers, polysulfones, and polycarbonates, have many desirable properties including outstanding electrical and mechanical properties, high heat distortion temperatures and self extinguishing properties. These high molecular weight polymers are useful for many commercial applications requiring high temperature resistance dimensional stability and electrical properties. However, for many uses the high melt viscosities and softening points are a disadvantage. For example, polyphenylene ether has a high glass transition temperature (211° C.), and the resin has a high melting point (262°–267° C.) and a high melt viscosity. Molded articles can be formed by melt processing techniques, but again, the high temperatures required are undesirable. Above 250° C. in the presence of oxygen, polyphenylene ether is rapidly degraded with the formation of gel and colored by-products. The resin is brittle and has low impact resistance.

Accordingly, efforts have been made to improve the melt flow by reducing the melt viscosity of the resins and their alloys. In general, these efforts have involved the use of a plasticizer, small amounts of low molecular weight compounds, aromatic and branched polyesters, polycarbonates, etc.

In U.S. Pat. No. 3,383,435 polystyrene is blended with polyphenylene ether to obtain improved processability. These blends provided many improved properties over either the styrene resin or the polyphenylene ether. However, they exhibit lower heat distortion temperatures compared to the polyphenylene ether resin.

U.S. Pat. No. 4,123,410 discloses a blend of polyphenylene ether and a plasticizer, such as a triphenyl phosphate, poly(1,4-butylene terephthalate) or a branched copolyester, and an impact modifying A-B-A copolymer of styrene. The heat distortion temperature was significantly reduced in the data shown.

U.S. Pat. No. 4,167,507 discloses compositions consisting of a polyphenylene ether and a hydrogenated block copolymer of the ABA type, where A designates a polymerized mono-alkenyl aromatic hydrocarbon block such as polystyrene and B designates a polymeric diene block. These blends had high impact strength, but heat distortion temperatures were significantly reduced when compared to polyphenylene ether resins.

In U.S. Pat. No. 4,189,411, is disclosed a mixture of a polyphenylene ether, a styrene resin and a resinous material having a softening point above the heat distortion temperature of the final composition. The resulting composition had significantly lower heat distortion temperatures than polyphenylene ether.

U.S. Pat. No. 4,385,146 discloses the use of tribenzylphosphine oxide to lower the viscosity of a polyphenylene ether resin-polystyrene blend.

U.S. Pat. No. 4,491,649 discloses polyphenylene ether resins modified with an ABA block copolymer or a polyolefin and an aromatic polycarbonate. These blends exhibit improved processability, useful properties and less reduction in heat distortion temperatures than prior art blends.

U.S. Pat. No. 4,530,952 discloses the use of diamides to improve the flowability of polyphenylene ether resins with minimal effect on heat resistance. In U.S. Pat. No. 4,684,684 these diamides were used to modify other thermoplastic resins such as polystyrenes, polycarbonates, polynorbornenes, polyarylates and polysulfones. A broader disclosure of amides as fluidity improving agents is disclosed in U.S. Pat. No. 4,663,375.

U.S. Pat. No. 4,544,703 discloses thermoplastic compositions comprising polyphenylene ether and polyalkenyl aromatic resin (e.g. styrene, chlorostyrene, alphamethylstyrene, vinyl xylene, divinyl benzene and vinyl naphthalene).

U.S. Pat. No. 4,563,500 discloses a polyphenylene ether resin combined with a styrene resin and with a combination of a block copolymer of the unsaturated type and a block copolymer of the saturated type. This combination provided improved melt flow, lowered cost and improved impact strength. However, including a styrenic resin and/or plasticizer, for attaining good mold flowability, substantially reduces the HDT value of such blends and thereby limits their upper end use temperatures.

U.S. Pat. No. 4,579,901 discloses compositions consisting of a combination of a polyphenylene ether resin or a polyphenylene ether resin modified with an alkenyl aromatic resin and a low viscosity polyester based plasticizing agent. Among the polyester plasticizers that are employed are those obtained as a reaction product of adipic acid and phthalic anhydride.

Although incorporation of melt flow modifiers as in the above referenced patents improves processability by reducing the melt viscosity, generally it leads to significant reductions in the heat deflection temperature and other desirable properties. On many occasions, such additives also cause incompatibility problems.

Another thermoplastic resin that would be desirable to process at lower temperatures is polyetherether ketone (PEEK). PEEK is a semi-crystalline engineering thermoplastic polymer having a high glass transition temperature (160° C.). It exhibits excellent mechanical and electrical properties, high heat distortion temperature and finds use in many composite applications. However, it has a high melting point, about 340° C. Thus, it has only been possible to melt process PEEK at temperatures above 350° C., typically at approximately 380° C. Heating at high temperatures, particularly if prolonged, as experienced during molding, is known to disturb PEEK's crystallization behavior which ultimately affects its physical properties. PEEK is also used for carbon fiber composite applications. Due to its high melt viscosity, the coating of PEEK onto carbon fiber is extremely difficult. High pressure must be exerted to improve PEEK'S wetting onto carbon fiber. Fiber spinning of PEEK at high temperatures, such as at 380° C. has also been very difficult. At such temperatures, the material tends to gel, resulting in screen pack plugging or frequent fiber breakage during take up. It is thus desirable that PEEK be melt processed at lower temperatures. Similar difficulties have been seen in the addition of additives to PEEK as in other thermoplastic resins previously described.

It is therefore an object of the current invention to improve the melt processability of engineering thermoplastics such as polyphenylene ethers, polysulfones, aromatic polycarbonates, polyether ether ketones, polyarylates, polyphenylene sulfides, polyimides, polyamides and polyarylether ketones and their alloys/blends. Another object of the invention is to prepare compositions without causing significant incompatibility problems in polymer performance. Yet another object of the invention is to prepare such compositions without lowering the thermal resistance, i.e., without lowering the glass transition ($T_g$) and heat distortion temperatures (HDT) of the thermoplastic.

SUMMARY OF THE INVENTION

It has been found that engineering thermoplastics compositions containing up to 30 weight percent of a low molecular weight, substantially saturated polyindane resin improves the melt processability of the resin by lowering the viscosity of the melt. Also, the polyindane imparts shear thinning properties in many cases. The polyindane resin is miscible with engineering thermoplastics to varied degrees. It is miscible with polyphenylene ehter and with polystyrene and no incompatiblity problem exists. The polyindane resin is miscible with polysulfones, polycarbonates and polyetherether ketones when present in small quantities (less than 10 weight percent). The Tg and HDT of blends prepared in accordance with the present invention are essentially unchanged or only marginally lowered by the polyindane resins. In terms of combined thermal resistance and reduced melt viscosity, the polyindane resin is superior to previously known processing aids.

DETAILED DESCRIPTION OF THE INVENTION

The polyindane containing resins useful in accordance with the present invention have low molecular weight and are substantially saturated. The preparation of such resins by cationic polymerization of diisopropenylbenzene has been reported by H. Brunner, et al., J. Polymer Science-Polymer Letters edition, 1958, Volume 28, p. 629. U.S. Pat. No. 4,205,160 is another source of information about the formation of indane containing polymers by the polymerization of m- or p-diisopropylbenzene diol or by the polymerization of m- or p-diisopropenyl benzene. The prior art teaches that such cationic polymerizations yield resins containing indane, 1-pentene and 2-pentene units as shown in I, II and III, seen below, respectively. The relative content of these polymers in a composition may be readily determined by $^{13}C$ NMR analysis. In the present invention the resin is predominately indane units (I below) and preferably 100 percent indane.

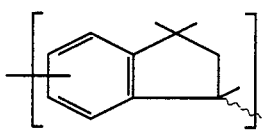

I

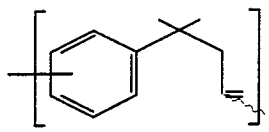

II

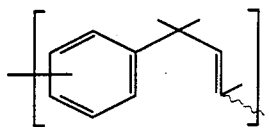

III

The diisopropenylbenzene monomer should preferably be in the meta isomer form only. If the para isomer is present, the meta isomer's content should be at least 95 wt. %, and preferably 98 wt. % or higher. The monomer's concentration in the polymerization medium can be varied to a wide range, although a 25 to 50 wt. % content is preferred for reasons of economy.

The aromatic solvent that can be used in this invention include all of the substituted aromatic compounds that are typically used as solvents. These include common solvents such as toluene, xylenes, and ethyl benzene. The halogenated aromatic solvents, such as chlorobenzene, and 1,2-dichlorobenzene, are preferred as increasing the percentage of saturated indane content in the polymer. Halogenated aliphatic solvents can also be used.

The catalysts useful in preparing the polyindanes of the present invention include acidic clay catalyst such as those marketed by Harshaw Filtrol Corporation of Los Angeles, California. These clays are acid-activated crystalline clays composed essentially of silica and alumina. A particularly suitable grade is Filtrol 22. Other acid treated clays can also be used such as Filtrol 113 and Filtrol 13. The acidified clay catalyst should be present in a sufficient quantity to yield the desired polyindane. Based on the monomer content, the catalyst level should be 1 to 20 wt. %, and preferably from 5 to 10 wt. %. Other effective catalysts include Bronsted acids and Lewis acids such as boron trifluoride, aluminum trichloride, ethyl aluminum dichloride, titanium tetra chloride etc..

The polymerization temperature should be above 80° C. and preferably at least about 100° C. or higher up to a maximum of 180° C. Lower polymerization temperatures result in increased levels of unsaturation or yield crosslinked products. Typically, the polymerization is conducted by dropwise addition of the m-diisopropenylbenzene monomer to a mixture of the solvent and the catalyst maintained at the desired polymerization temperature. The length of the monomer addition period is not critical, but should be completed as soon as possible. After monomer addition is completed, the monomer is present in a concentration greater than 25 wt. % of the mixture. The polymerization is typically carried out for 1 to 5 hours, and preferably for about 1 to 2 hours, after the completion of the monomer addition. Shorter polymerization times have been found to yield polymers containing undesirable unsaturation functionalities, while longer polymerization times yield materials having broader molecular weight distributions.

Polyindane resins suitable for use in accordance with this invention should be substantially saturated; the unsaturation functionality should not exceed 3 mole %

(based on diisopropenylbenzene) and preferably be none or at most less than 1 mole %. The indane content of the resin (the percentage of I) should be at least 90%, preferably 95% and most preferably 100%. The weight average molecular weight of the resin should be less than 10,000 and the resin should have a melting point of about 150° C. or higher, preferably higher than 200° C. Polyindane resins with varied indane content, molecular weight and glass transition temperatures can be prepared by varying the polymerization conditions as is well known to those skilled in the art.

The engineering thermoplastic resins that can be used are generally characterized by high thermal resistance and many desirable physical properties. They include polyphenylene ethers, polysulfones, polycarbonates, polyaryl ether ketones, polyetherether ketones, polyarylates, polyphenylene sulfide, polyimides and polyamides. The engineering thermoplastics useful in this invention also include the alloys and blends of these polymers. For example, the polyphenylene ethers include the blends with various styrene resins such as polystyrene, impact polystyrene, styrene copolymers including graft (e.g., ABS) and block (e.g., SBS, SIS) copolymers.

The polyphenylene ether resin (PPE) employed in accordance with this invention is preferably of the type having the formula:

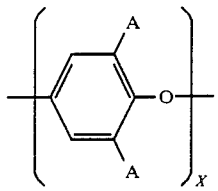

where x is greater than 50 and A is a substituent selected from hydrogen, halogen, hydrocarbon radical, or halohydrocarbon radical. Preferably, the PPE resin is selected from the group consisting of poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether and poly(2,6-dipropyl-1,4-phenylene) ether. Most preferably the PPE resin is poly(2,6-dimethyl-1,4-phenylene) ether.

The rubbery impact modifiers useful in the practice of this invention with the polyphenylene ethers are those previously used in the art, either alone, or in combination, to impact modify PPE resins and include a variety of diene rubbers, AB, and ABA block copolymer rubbers. The useful ABA block copolymer impact modifiers are copolymers having end blocks A formed of vinyl aromatic hydrocarbon monomer such as styrene, methyl styrene or mixtures thereof and a center block B formed of a 1,3-diene such as butadiene or isoprene. The ABA block copolymers may also be hydrogenated to reduce the ethylenic unsaturation content. The ratio of A and B units and the molecular weights of the ABA block copolymers may be varied widely; the A blocks should preferably comprise 2–31 weight percent of the block copolymer. Such block copolymers are widely available commercially both in hydrogenated and unhydrogenated versions. Block copolymers such as styrene-isoprene-styrene, styrene-butadiene-styrene, and styrene-ethylene-butadiene-styrene block copolymers marketed under the tradename Kraton (sold by Shell Chemical Company) are suitable.

Other rubbery impact modifiers suitable for blending with PPE resin can also be used for practising this invention. These include styrene-1,3 diene copolymers and graft copolymers, and polyolefin copolymers such as ethylene-propylene copolymers.

The polyindane resins used in this invention can also be used to aid in the melt processing of polyetherether ketone (PEEK). The addition of 10 parts polyindane to 90 parts PEEK, lowered PEEK's melt viscosity, at 380° C. by 37%.

In addition, the polyindane resins used in this invention can be blended with such block copolymers as listed above as well as block copolymers containing substituted vinyl aromatic and aliphatic blocks in the absence of other thermoplastic polymers. As demonstrated in Examples 40–42, the presence of the polyindane resin lowers the melt viscosity of the block copolymer, enhances the glass transition temperature of the end block without affecting that of the midblock and improves the tensile strength, modulus and hardness without lowering the elongation.

The compositions of this invention can be varied in a wide range depending on the miscibility of the resins and the physical properties desired. However, compositions containing 1–30 weight percent polyindane resin are found to be suitable with 1–20 weight percent preferred. When polyphenylene ether is the thermoplastic resin used, the compositions will comprise 100 parts by weight of a blend of polyphenylene ether and a rubbery impact modifier and about 5–25 parts by weight of the polyindane resin. The blend will comprise 50–98 weight percent of polyphenylene ether and 2–50 weight percent of the rubbery impact modifier.

When the blend is a thermoplastic block copolymer combined with a polyindane resin, the low molecular weight substantially saturated polyindane resin is present as 1–50 wt. % of the composition. The polyindane resin's low molecular weight makes it miscible with the aromatic block component of the thermoplastic block copolymer. Its high glass transition temperature raises the ring and ball softening temperature of the blend and raises the glass transition temperature of the aromatic block component of the thermoplastic block copolymer.

The compositions of this invention can be prepared by either blending in solution or by melt blending. Thus, the resins can be blended in a common solvent such as chlorobenzene or chloroform and the resin blend collected after precipitation in excess methanol. The resin blend is then dried. More conveniently, the compositions are prepared by premixing the components and passing the blend through an extruder maintained at a temperature from about 290°–310° C. at 150 rpm. The compositions are characterized for melt viscosity, glass transition temperature (Tg) and heat distortion temperature. Compositions of the present invention can be molded or extruded into useful articles of manufacture by means known to those skilled in the art. Conventional additives, such as reinforcing and nonreinforcing fillers, pigments, stabilizers and lubricants, can be employed in the practice of the present invention.

The compositions of this invention are illustrated in the following examples. These are not intended to limit the invention in any manner.

EXAMPLE 1

Preparation of Polyindane Resin

Chlorobenzene (50 g) and Filtrol 22 acidified clay (5 g) were charged into a 3-neck flask and maintained under stirring at 100° C. m-Diisopropylbenzene (50 g) was added dropwise while maintaining the temperature at 100° C. The polymerization was carried out for 1 hour at 100° C. after which the clay was filtered off and the polymer was precipitated in excess methanol. The polymer was filtered off and dried in a vacuum oven. The polymer had the following properties: melting point 215° C., Tg 173° C. and weight average molecular weight (SEC) 4370, indane content 100%. Other polyindane resins having different indane contents and exhibiting varied Tgs were prepared in a similar fashion by varying polymerization conditions, including polymerization temperature and the reaction medium.

EXAMPLES 2-10

In Examples 2-10 engineering thermoplastic-polyindane resin blends from different polyindane resins were prepared by dissolving in a common solvent and isolated after precipitation in methanol. Table 1 includes the Tg of the blends. In each case a single Tg was obtained, by DSC, indicating miscibility of the resins. Results also show that the indane content and Tg of the polyindane resin influences the Tg of the blends, as seen in Examples 2-4.

TABLE 1

Glass Transition Temperatures of Engineering Thermoplastics - Polyindane Blends

| Example | Engineering[1] Thermoplastics | Tg °C. | Polyindane Resin Indane Content % | Tg °C. | Composition[2] | Blend Tg, °C. |
|---|---|---|---|---|---|---|
| 2 | PPE | 211 | 89 | 96 | 70/30 | 176 |
| 3 | PPE | 211 | 98 | 165 | 70/30 | 189 |
| 4 | PPE | 211 | 100 | 173 | 70/30 | 201 |
| 5 | PPE | 211 | 100 | 173 | 90/10 | 203 |
| 6 | PS | 196 | 100 | 173 | 95/5 | 196 |
| 7 | PS | 196 | 100 | 173 | 90/10 | 196 |
| 8 | PES | 232 | 98 | 172 | 95/5 | 232 |
| 9 | PES | 232 | 98 | 172 | 90/10 | 232 |
| 10 | PC | 146 | 100 | 173 | 95/5 | 145 |

[1]PPE: Poly(2,6-dimethyl 1,4-Phenylene)oxide
PS: Polysulfone Udel P1700
PES: Polyether sulfone
PC: Polycarbonate
[2]Composition: Engineering Thermoplastic/Polyindane (W/W)

EXAMPLES 11-20

Table 2 presents the melt viscosities of engineering thermoplastics - polyindane resin blends employing the polyindane resin of Example 1. Results show significant reductions in melt viscosities for blends containing 5-10 weight percent polyindane.

TABLE 2

Melt Viscosity of Engineering Thermoplastics - Polyindane Resin Blends

| Example | Engineering Thermoplastic | Polyindane Wt. % | Temp. °C. | Melt Viscosity, Poise 10 rad/sec | 100 rad/sec |
|---|---|---|---|---|---|
| 11 | PPE[1] | 0 | 280 | $5.76 \times 10^4$ | $1.78 \times 10^4$ |
| 12 | PPE[1] | 5 | 280 | $1.29 \times 10^4$ | $4.30 \times 10^3$ |
| 13 | PPE[1] | 10 | 280 | $1.30 \times 10^4$ | $3.49 \times 10^3$ |
| 14 | PS[2] | 0 | 300 | $3.80 \times 10^4$ | $2.17 \times 10^4$ |
| 15 | PS[2] | 5 | 300 | $1.58 \times 10^4$ | $5.12 \times 10^3$ |
| 16 | PES[3] | 0 | 300 | $1.16 \times 10^5$ | $2.54 \times 10^4$ |
| 17 | PES[3] | 10 | 300 | $1.16 \times 10^4$ | $3.94 \times 10^3$ |
| 18 | PC[4] | 0 | 250 | $3.0 \times 10^4$ | $2.15 \times 10^4$ |
| 19 | PC[4] | 5 | 250 | $2.25 \times 10^4$ | $1.25 \times 10^4$ |
| 20 | PC[4] | 10 | 250 | $2.0 \times 10^4$ | $1.05 \times 10^4$ |

[1]Poly(2,6 dimethyl 1,4 Phenylene) oxide
[2]Polysulfone Udel 1800
[3]Polyether Sulfone
[4]Bisphenol A Polycarbonate

EXAMPLES 21-27

Table 3 summarizes the effect of the polyindane resin of Example 1 on the melt viscosity, Tg and HDT of polyphenylene ether and its alloys. Example 23 is a comparative example using Picco 5140, a hydrocarbon resin produced by Hercules Incorporated, that is commonly used as a processing aid for PPE, and is outside the scope of the present invention. The data demonstrates that polyindane lowers the melt viscosity without influencing the Tg and HDT of the thermoplastic resins. Compared to Picco 5140, the polyindane resin yields superior performance compositions.

TABLE 3

Melt Viscosity, Tg and HDT of Engineering Thermoplastics/Polyindane Blends

| Example | Engineering[1] Thermoplastic | Polyindane Wt. % | Viscosity[2] $10^4$ Poise | Tg[3] °C. | HDT[264 PSI] °C. |
|---|---|---|---|---|---|
| 21 | PPE | 0 | 4.9 | 215 | 185 |
| 22 | PPE | 15 | 2.5 | 213 | 180 |
| 23 (comp) | PPE | 15[4] | 1.8 | 198 | 162 |
| 24 | Noryl N300 | 0 | 1.7 | 184 | 140 |
| 25 | Noryl N300 | 15 | 1.2 | 184 | 140 |
| 26 | Noryl GTX 910 | 0 | 2.5 | 212 | 143 |
| 27 | Noryl GTX 910 | 15 | 1.4 | 207 | 140 |

[1]PPE: Poly(2,6 dimethyl 1,4 Phenylene) oxide from Borg Warner
Noryl N300 - blend of PPO, impact modifier and flow modifier (General Electric)
Noryl GTX - blend of PPE and Nylon (General Electric)
[2]Melt Viscosity at 280° C.
[3]Tg by DMA analysis
[4]Picco ® 5140 (Hercules), instead of Polyindane, - for comparison purposes

EXAMPLES 28-31

Table 4 summarizes the melt viscosity, Tg and HDT of impact polyphenylene ether compositions comprising a poly(2,6-dimethyl 1,4-phenylene) ether, and ABA type block copolymer and the polyindane resin of Example 1. Examples 28 and 29 are controls that do not contain the polyindane resin. This data shows that the inclusion of the polyindane substantially lowers the melt viscosity with only marginal lowering in Tg or HDT.

TABLE 4

Polyphenylene Ether Compositions Containing Impact Modifier

| Example | 28 | 29 | 30 | 31 |
|---|---|---|---|---|
| Impact modifier[1] | — | — | Kraton G 1650 | Kraton G 1652 |
| PPE/Polyindane/Impact modifier (w/w) | 100/0/0 (control) | 85/15/0 | 85/15/5 | 85/15/5 |
| Melt Viscosity, $10^4$ Poise (280° C./100 rad. sec.$^{-1}$) | 4.9 | 3.2 | 3.0 | 2.4 |
| Tg, °C.[3] | 215 | 213 | 213 | 213 |
| HDT, °C. (264 PSI) | 185 | 180 | 180 | 178 |

[1] Kraton G 1650: SEBS block copolymer - Shell Chemical
Kraton G 1652: SEBS block copolymer - Shell Chemical
[2] PPE: Poly(2,6-dimethyl 1,4 phenylene) ether - Borg Warner Chemicals
[3] by DMA analysis

EXAMPLES 32–34

In Table 5 is shown the physical properties of an impact polyphenylene ether composition comprising 85/15/5 parts by weight of poly(2,6-dimethyl-1,4-phenylene) ether, polyindane resin and Kraton G 1652 (Example 34). Examples 32 and 33 are for reference purposes only. The results show that the PPE composition of Example 34 has good impact strength with other physical properties being almost comparable to that of the control PPE. The composition's melt viscosity is half of the control and yet the HDT is only marginally lowered.

EXAMPLES 35–36

In Table 6 is seen the reduction in melt viscosity at 380° C. of a polyetherether ketone-polyindane blend as compared to polyetherether ketone.

EXAMPLES 37–38

Table 7 presents the melt spinning of PEEK containing polyindane resin. The results show the presence of 10 weight percent polyindane enables PEEK to be spun at a lower temperature and at a higher take up speed without fiber breakage. Presence of polyindane contributes to some lowering in tensile strength and modulus; however, the fiber spun at the higher draw ratio exhibits a much higher modulus while retaining the original tensile strength.

TABLE 5

Physical Properties of Impact Polyphenylene Ether Compositions

| Example | 32 | 33 | 34 |
|---|---|---|---|
| Impact Modifier | None | None | Kraton G 1652 |
| PPE/Polyindane/Impact Modifier[1] | 100/0/0 | 85/15/0 | 85/15/5 |
| Tensile Strength, KSI | 10.9 | 10.7 | 9.5 |
| Tensile Modulus, KSI | 323 | 323 | 297 |
| Flexural Strength, KSI | 15.7 | 15.7 | 14.1 |
| Flexural Modulus, KSI | 390 | 390 | 360 |
| Elongation % | 115 | 50 | 70 |
| Notched Izod, ft. lb./in. | 0.64 | 0.50 | 1.72 |
| HDT (264 PSI), °C. | 185 | 180 | 178 |
| Melt Viscosity, $10^4$ poise[2] | 4.9 | 3.2 | 2.4 |

[1] for description - see footnote of Table 4
[2] at 280° C./100 rad. sec.$^{-1}$

TABLE 6

Properties of 90/10 PEEK - Polyindane Blend

| | PEEK Polyindane (w/w) | Melt Viscosity (380° C.), $10^4$ Poise | | | |
|---|---|---|---|---|---|
| Example | | 1 rad sec | 10 rad sec | 100 rad sec | 400 rad sec |
| 35 | 100/0 | 5.164 | 4.383 | 3.003 | 2.049 |
| 36 | 90/10 | 4.885 | 3.627 | 2.145 | 1.300 |

TABLE 7

Fiber Spinning of PEEK Containing Polyindane

| Example | PEEK Polyindale w/w | Spinning Temp. °C. | Draw Ratio | Take Up Speed m/min | Tensile Strength $10^3$ PSi | Modulus $10^3$ PSi | Fracture Strain % |
|---|---|---|---|---|---|---|---|
| 37 | 100/0 | 385 | 18 | 30 | 27.5 | 437.5 | 318.6 |
| 38 | 90/10 | 376 | 18 | 30 | 19.6 | 402.4 | 276.4 |
| 39 | 90/10 | 376 | 36 | 60 | 27.7 | 578.3 | 215.3 |

EXAMPLES 40–42

Table 8 compares the properties of a styrene-ethylenebutadiene-styrene (SEBS) linear block copolymer which is unmodified by polyindane resin (Example 40) with 80/20 and 70/30 blends (Examples 41 and 42, respectively) of the block copolymer to polyindane. The SEBS block copolymer used was Kraton G 1650 sold by Shell Chemical Company, Oak Brook, Illinois. The presence of the polyindane resin results in enhanced glass transition temperature of the end block without affecting that of the midblock and improves tensile strength, modulus and hardness without lowering the elongation.

TABLE 8

Properties of Polyindane Resin Styrene-ethylene-butadiene-styrene Block Copolymer (Kraton G 1650)

| Example | 40 | 41 | 42 |
|---|---|---|---|
| Blend Composition, Kraton/Polyindane (w/w) | 100/0 | 80/20 | 70/30 |
| Properties | | | |
| Tensile Strength, PSI | 3828 | 4304 | 4774 |
| 300% Modulus, PSI | 636 | 1018 | 1365 |
| Elongation, % | 572 | 567 | 509 |
| Hardness, Shore A | 83 | 96 | 96 |
| Viscosity, $10^3$ poise | | | |
| at 220° C. | 37 | 12 | 3 |
| at 250° C. | 30 | 3.2 | 2.5 |
| Tg, °C. | | | |
| Mid Block | −45 | −45 | −45 |
| End Block | 100 | 118 | 126 |

Other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic engineering resin composition comprising 70-99 parts by weight of a thermoplastic resin selected from the group consisting of polyphenylene ethers, aromatic polycarbonates, polysulfones, polyaryl ether ketones, polyarylates, polyimides, polyphenylene sulfides and polyamides and 1-30 parts by weight of a polyindane resin wherein said polyindane resin is made by polymerization of diisopropenylbenzene.

2. The resin composition of claim 1 further comprising a rubbery impact modifier.

3. The resin composition of claim 2 wherein said impact modifier is selected from the group consisting of diene rubbers, ABA block copolymers and AB block copolymers wherein said A blocks comprise a vinyl aromatic hydrocarbon monomer and said B blocks comprise a 1,3 diene.

4. The resin composition of claim 1 wherein said polyindane resin comprises at least 95% units containing an indane group.

5. The resin composition of claim 4 wherein said polyindane resin comprises about 100% units containing an indane group.

6. The resin of claim 1 wherein said thermoplastic resin is a polyphenylene ether.

7. The resin of claim 6 wherein said polyphenylene ether has the formula

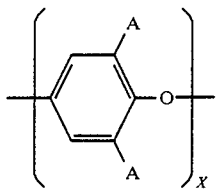

where x is greater than 50 and A is a substituent selected from the group consisting of hydrogen, halogen, hydrocarbon radical, and halohydrocarbon radical.

8. The composition of claim 7 wherein said polyphenylene ether is selected from the group consisting of poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether and poly(2,6-dipropyl-1,4-phenylene) ether.

9. A resin composition comprising 100 parts by weight of a blend of an engineering thermoplastic and a rubbery impact modifier and about 5-25 parts by weight of a polyindane resin made by polymerization of diisopropenylbenzene, wherein said engineering thermoplastic is selected from the group consisting of polyphenylene ethers, polysulfones, polycarbonates, polyarylates, polyphenylene sulfides, polyamides, polyimides and polyaryl ether ketones.

10. The resin composition of claim 9 wherein the rubber impact modifier is selected from the group consisting of styrene-butadiene-styrene block copolymers, hydrogenated styrene-butadiene-styrene block copolymers, styrene-1,3 diene copolymers, styrene-1,3 diene graft copolymers and polyolefin copolymers.

11. The composition of claim 9 wherein said polyindane resin has an indane content of at least 95%.

12. The composition of claim 11 wherein said polyindane resin has an indane content of about 100%.

13. The composition of claim 9 wherein said engineering thermoplastic is a polyphenylene ether.

14. The composition of claim 9 wherein said engineering thermoplastic is a polysulfone.

15. The composition of claim 9 wherein said engineering thermoplastic is a polyetherether ketone.

16. (Amended) A resin composition comprising from 50-99 weight percent of a thermoplastic block copolymer and from 1-50 weight percent of a substanially saturated polyindane resin wherein said polyindane resin is made by polymerization of diisopropenylbenzene monomer and said thermoplastic block copolymer is selected from the group consisting of styrene-isoprene-styrene, styrene-butadiene-styrene and styrene-ethylene-butylene-styrene block copolymers.

17. The resin composition of claim 16 wherein said monomer is between about 98 to about 100% meta isomer.

18. The resin composition of claim 16 wherein said polyindane resin has an indane content of about 100%.

* * * * *